United States Patent [19]

Walt

[11] Patent Number: 5,026,238

[45] Date of Patent: Jun. 25, 1991

[54] BALE HANDLER

[76] Inventor: William G. Walt, 642 Sydney Street, Belleville, Ontario, Canada, K8P 4A8

[21] Appl. No.: 481,248

[22] Filed: Feb. 20, 1990

[30] Foreign Application Priority Data

Dec. 19, 1989 [CA] Canada .................................. 2005958

[51] Int. Cl.$^5$ ...................... B65B 11/04; A01D 87/12
[52] U.S. Cl. .................................. 414/24.5; 414/24.6; 414/786; 414/911; 53/587; 242/86.52
[58] Field of Search ........................ 414/24.5, 24.6, 25, 414/705, 911, 468, 786; 53/399, 587, 211, 588, 556; 242/86.5 R

[56] References Cited

U.S. PATENT DOCUMENTS

| | | | |
|---|---|---|---|
| 3,096,896 | 7/1963 | Norton et al. | 214/730 |
| 3,334,762 | 8/1967 | Davis | 214/730 |
| 4,120,405 | 10/1978 | Jones | 214/1 HH |
| 4,161,253 | 7/1979 | Ralston et al. | 414/25 |
| 4,256,426 | 3/1981 | Buss | 414/24.5 |
| 4,343,132 | 8/1981 | Lawless, Jr. | 53/399 |
| 4,407,113 | 10/1983 | Core | 56/341 |
| 4,409,784 | 10/1983 | Van Ginhoven et al. | 56/341 |
| 4,583,900 | 4/1986 | Cooley | 414/24.5 |
| 4,594,836 | 6/1986 | Good | 53/459 |
| 4,606,172 | 8/1986 | Miller | 53/399 |
| 4,648,769 | 3/1987 | Stirling | 414/24.6 |
| 4,662,151 | 5/1987 | Mathes et al. | 53/587 |
| 4,827,699 | 5/1989 | Shauman | 53/587 |
| 4,827,700 | 5/1989 | Rampe et al. | 53/487 |
| 4,886,409 | 12/1989 | Penner | 414/24.6 |
| 4,891,930 | 1/1990 | Schaefer | 414/24.6 X |
| 4,926,617 | 5/1990 | Van Mill | 53/587 |

FOREIGN PATENT DOCUMENTS

| | | |
|---|---|---|
| 1010415 | 5/1977 | Canada . |
| 1014114 | 7/1977 | Canada . |
| 1039222 | 9/1978 | Canada . |
| 1065808 | 11/1979 | Canada . |
| 1086630 | 9/1980 | Canada . |
| 1100914 | 5/1981 | Canada . |
| 1136095 | 11/1982 | Canada . |
| 1218594 | 3/1987 | Canada . |
| 1234313 | 3/1988 | Canada . |
| 1248864 | 1/1989 | Canada . |
| 1250800 | 3/1989 | Canada . |
| 1258033 | 8/1989 | Canada . |

Primary Examiner—David A. Bucci
Assistant Examiner—Brian K. Dinicola
Attorney, Agent, or Firm—Fisher, Christen & Sabol

[57] ABSTRACT

The invention is an improved bale handling and wrapping apparatus adapted to be fitted on the front-end loader or three-point hitch of a power source. The round bale handler of the present invention is capable of handling, stacking, transporting, wrapping and dispensing bales of hay. A spindle probe adapted to engage the bale of hay is mounted for lateral movement on a transverse frame. The frame extends outwardly to one side of the power source beyond the line of travel. A removable wrapping arm is fitted on the frame. The spindle probe can be moved laterally across the frame to accommodate bales of varying diameters, such that the wrapping arm is positioned adjacent the outer most portion of the bale. Thereafter the spindle is rotated and the wrapping material applied to the bale. Furthermore, when a bale of hay requires to be dispensed into a hay bunk, the spindle probe is moved laterally to the remote side of the extended frame and rotated in a counterclockwise direction while the vehicle is driven alongside of the bunk thereby depositing hay beside the vehicle as the machine moves forwardly.

6 Claims, 5 Drawing Sheets

BALE HANDLER

This invention is related to bale handling and wrapping devices and particularly to handling and wrapping devices for large round bales weighing from five hundred to fifteen hundred pounds.

BACKGROUND

There are many bale handling and wrapping devices known in the art. However, a need exists for a bale handling and wrapping device that can carry out all the functions required, for handling wrapping and dispensing bales. Presently, there are devices adapted to stack and transport hay and wrap the same with plastic wrap such as that disclosed in Canadian Patent 1,258,033 (Gainforth). The device, however, can only dispense hay directly in front of the power source. This presents a disadvantage when it is necessary to provide hay to a long bunk as it is necessary to unwrap the bale and then manually pitchfork the hay into the bunk.

U.S. Pat. No. 4,648,769 (Sterling) discloses and claims an invention which has a forward extending spike or spindle which does not rotate but rather pivots through a range of 180°. After spiking the bale, the spike is rotated sideways and the bale lowered to the ground. The forward motion of the tractor achieves the unrolling of the bale beside the line of travel of the tractor. This device, however, is not capable of wrapping bales with plastic wrap.

Canadian Patent 1,039,222 (Dalman) discloses and claims a dispensing apparatus for circular hay bales which uses a cutting apparatus to dig into the bale as the bale rotates. This dispenses the hay into a chute which is laterally aligned such that the hay is deposited in a linear arrangement along the side of a tractor. Again, this invention is not capable of wrapping the bales.

The presently known art does not provide for an inexpensive, simple, functional apparatus adapted to be fitted on a front end loader or three-point hitch of an ordinary farm tractor which can be used for handling, stacking, transporting, wrapping and dispensing round bales of hay into a linear bunk.

It is therefore an object of the present invention to provide an apparatus which is capable of carrying out all of the functions required for large bales in a single inexpensive machine.

It is also an object of the present invention to provide a device which can wrap round bales of hay of varying diameters with plastic wrap.

It is also an object of the present invention to provide a bale handler and wrapper which is capable of lifting and transporting bales and dispensing hay to the side of the line of travel of the power source.

SUMMARY OF THE INVENTION

Therefore, this invention seeks to provide a bale handling and wrapping apparatus adapted to be installed on a front-end loader or three-point hitch of a power source comprising: a rectangular frame, said frame adapted to be mounted transverse to the line of travel of said power source and extending outwardly on at least one side thereof; a large spindle probe rotatably mounted on said frame and extending perpendicularly outwardly from the plane of said frame; said spindle probe being activated by a hydraulic motor and being adapted to engage a round bale of hay and rotate the same; said spindle probe including a circular backing plate on which are mounted a plurality of smaller bale engaging probes extending perpendicularly outward therefrom; said frame including at least one aperture adapted to receive a wrapping means; said wrapping means being adapted to receive a roll of plastic sheeting and dispense the same; said wrapper means extending perpendicularly outwards from said frame and parallel to said spindle probe; wherein in operation, said spindle probe on said sliding frame is adapted to be moved laterally across said main frame from side to side by a transversing means thereby facilitating the wrapping of bales of varying diameter and permitting the dispensing of hay to the side of the line of travel of said power source.

DESCRIPTION OF THE INVENTION

In a preferred embodiment, the invention comprises a rectangular main frame which is adapted to be mounted on a front-end loader or at the rear of a tractor on a three-point hitch. A sliding frame is adapted to move laterally within the rectangular frame from one side to the other. A spindle probe which extends perpendicularly outwardly and forwardly from the frame is pivotally mounted on the second sliding frame. The spindle probe is adapted to engage through the center of a round bale of hay. The large probe is also equipped with a twisted steel rod which allows it to grip the bale of hay when rotating. It is also equipped with a backing plate and a number of smaller probes which are adapted to be imbedded within a bale of hay. The sliding frame moves laterally across the main frame by means of a chain drive powered by a hydraulic motor.

The rectangular main frame is constructed to extend outwardly to one side of the tractor. On the top right and top left corners of the main frame are apertures in the form of square tubing. These are adapted to receive a plastic wrapping assembly. The wrapping assembly appears as an arm with a suspending rack similar to the rack used for paper towels or other wrapping material. It is tensioned by means of an elastic resilient means.

The wrapping assembly extends perpendicularly outward from the frame parallel to the main spindle probe which engages the hay bale.

The spindle probe is rotated by a motor such as a hydraulic or electric motor which activates a system of gears to insure the proper speed of rotation for dispensing and wrapping a bale. The wrapping assembly is adapted to carry twenty inch plastic wrap or fifty inch wrap.

Twenty inch wrap is mounted on a moveable rack assembly which is moved manually along a wrapper arm in order to helically wrap a bale.

The fifty inch wrapping assembly can be installed in the same aperture and used for wrapping an entire four foot long bale with one roation.

The benefit of extending the rectangular frame outwardly to one side of the power source is that hay can be dispensed along the side of the path of travel of the vehicle. This is particularly advantageous when dispensing hay into a long hay bunker or on the appropriate side of a fence. The tractor can move along the fence and dispense hay without constantly backing up and going forwards.

In operation, the frame is secured to the front end loader of a tractor. Thereafter the driver positions the spindle probe so that it is basically in the center of gravity of the vehicle. The front end loader is lowered so a stacked bale may be speared by means of the spindle probe. Thereafter the entire apparatus is raised by the front end loader and the bale is moved to another area. If the operator wants to wrap the bale with plastic wrap, the spindle probe is moved sideways on the sliding frame until the outer extremity of the bale is adjacent the wrapping assembly arm. By moving the spindle probe and accompanying bale sideways, bales of differing diameters can be effectively covered by the plastic wrap.

In operation, the wrap is applied to the bale as the hydraulic motor rotates the spindle probe until the plastic is wrapped upon itself; then the plastic wrap is cut and the bale is stacked for storage in the wrapped condition.

If a farmer wants to dispense hay, the farmer moves the vehicle alongside a bunk feeder and then activates a transversing means by the hydraulic motor. The transversing means comprises a chain drive which extends about idler sprockets from the motor across the frame, attaching to each side of the sliding frame. The sliding frame moves the spindle probe assembly laterally to the extreme end of the frame. Thereafter the spindle probe is rotated in the counter-clockwise direction by activating a second hydraulic motor. This dispenses hay into the bunk feeder alongside the path of travel of the tractor.

By using the apparatus of the present invention, the farmer can dispense a great quantity of hay in a side bunk feeder in a short period of time.

BRIEF DESCRIPTION OF THE DRAWINGS

The invention is more fully described in connection with the following drawings, wherein.

DETAILED DESCRIPTION OF THE INVENTION

Figure 1:
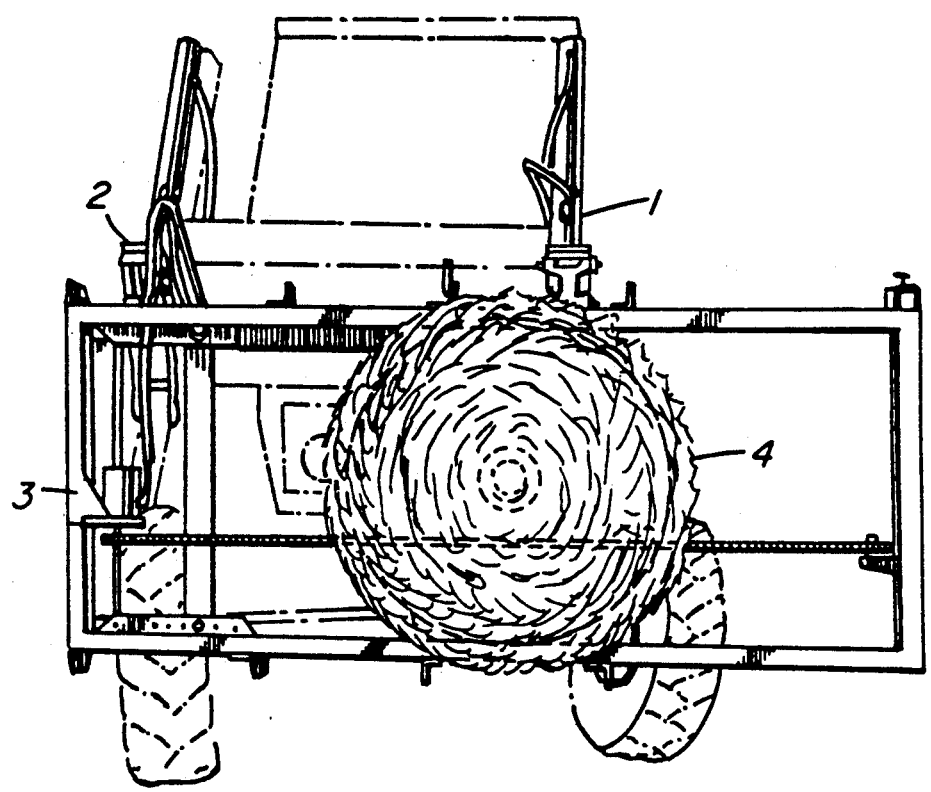
FIG. 1 is a perspective view of the invention mounted on a front-end loader of a farm tractor, in a transporting and handling position.

In FIG. 1 one sees a tractor 1 having a front-end loader 2 on which is attached the bale handling apparatus of the present invention 3 with a round bale of hay 4 thereon.

In FIG. 1, the bale is centered on the apparatus for transportation purposes.

Figure 2:
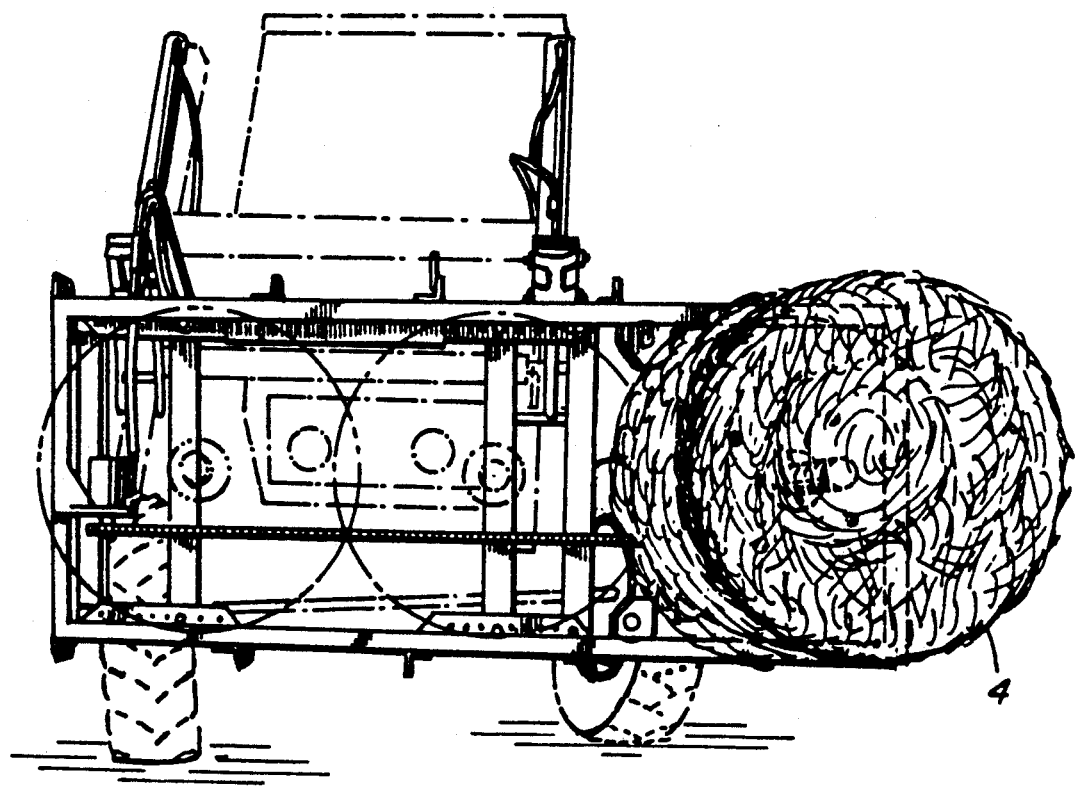
FIG. 2 is a second perspective view of the invention in the dispensing position.

In FIG. 2 the bale 4 has been moved to the side of the apparatus in the dispensing position for a hay bunk.

Figure 3:
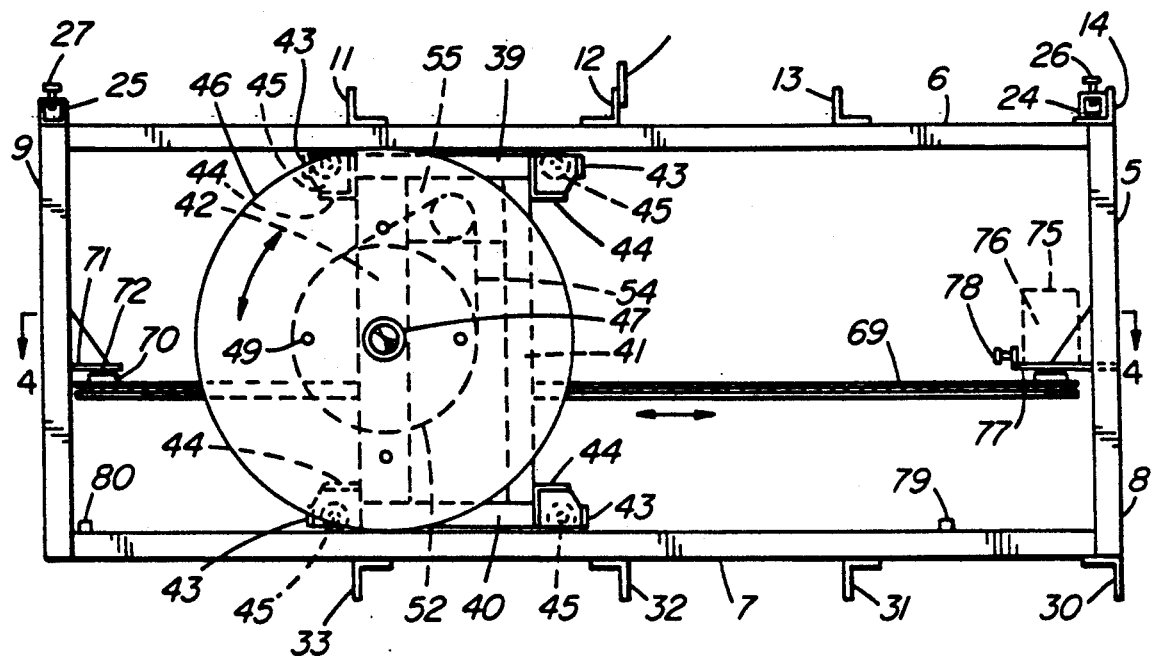
FIG. 3 is a front view of the invention.

In FIG. 3, there is shown a front view of the invention not mounted on a tractor. There is a rectangular frame 5 having an upper frame member 6, a lower frame member 7, a right upstanding frame member 8 and a left upstanding frame member 9 thereby creating a rectangular frame 5.

Figure 5:
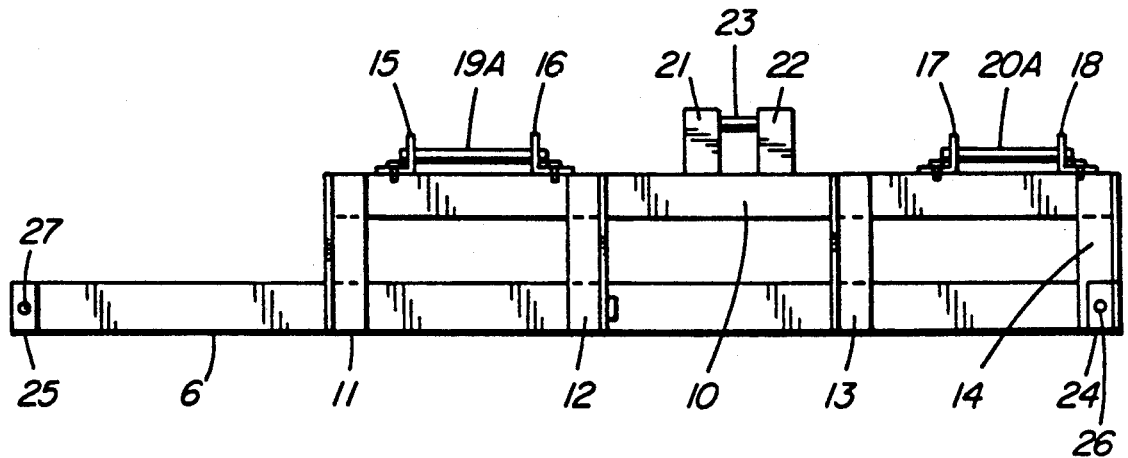
FIG. 5 is a top view of the invention.

In FIG. 5 one sees a top view of the frame also illustrating the rear portion of the frame with an upper rear frame member 10 in the form of an angle iron. At right angles to upper main frame member 6 are four angle irons 11, 12, 13 and 14 which connect the upper main frame member 6 to the rear upper frame member 10. Vertically mounted to the rear of the frame are angle irons 15 and 16 which make up a left support member. Similarly, on the right side of the rear of the frame one notes angle irons 17 and 18 which are vertically mounted and spaced apart to form a right support member. Pins 19A and B are horizontally disposed within the left support member and pins 20A and B are horizontally disposed within the right support member between angle irons 17 and 18. The right and left support members are used to couple the apparatus onto a front end loader. Central of the left and right support members is an additional support member used for a three-point hitch. It is comprised of angle irons 21 and 22 with a pin 23 for insertion in between.

Thus it can be seen that the apparatus of the present invention can either be mounted on a standard front-end loader, or by using angle irons 21 and 22 and pin 23, the apparatus can be mounted on a standard three-point hitch of a farm tractor.

On each end of the upper frame member 6 a wrapping frame mount 24 and 25 is welded. These mounts are used to secure a wrapping arm with plastic wrap. This will be described in greater detail in drawings 8 and 9. Bolts 26 and 27 are used to secure the wrapping arm into the wrapping frame mounts.

The apparatus is also equipped with a lifting lug 28, as shown in FIG. 3, which facilitates transport of the apparatus of the present invention when it is not mounted on a tractor.

Figure 7:
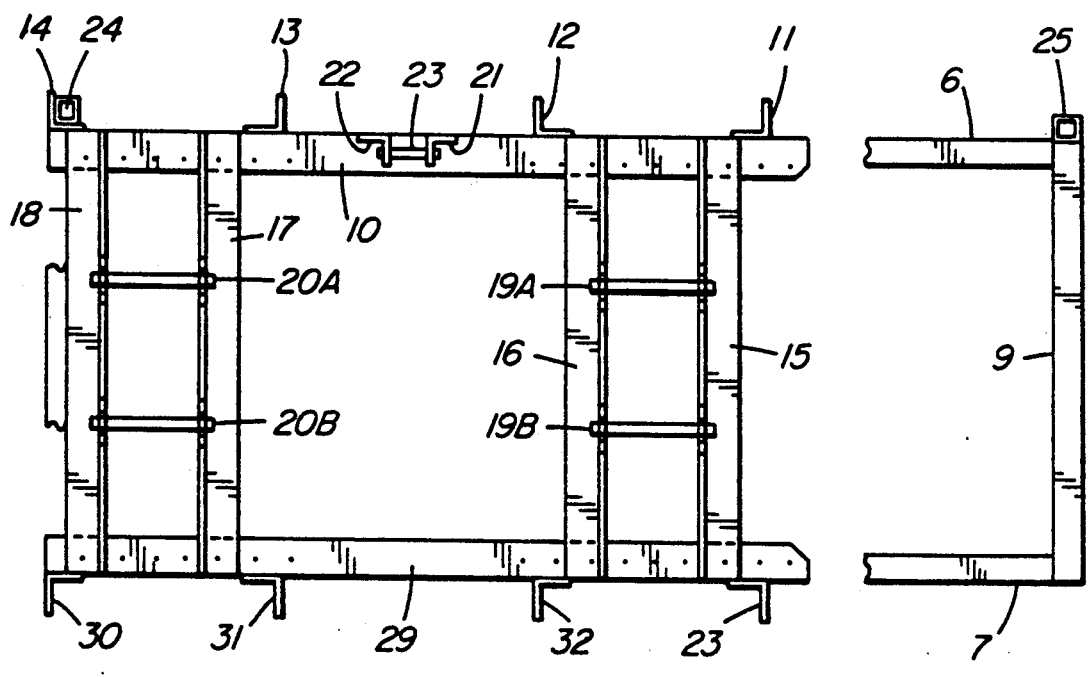
FIG. 7 is a rear view of the invention.

In FIG. 7, one notes that the rear portion of the frame has a lower frame member 29 which is also composed of angle iron. Extending from the front lower main frame member 7 to the lower rear frame member 29 at right angles thereto are angle irons 30, 31, 32 and 33.

Figure 9:
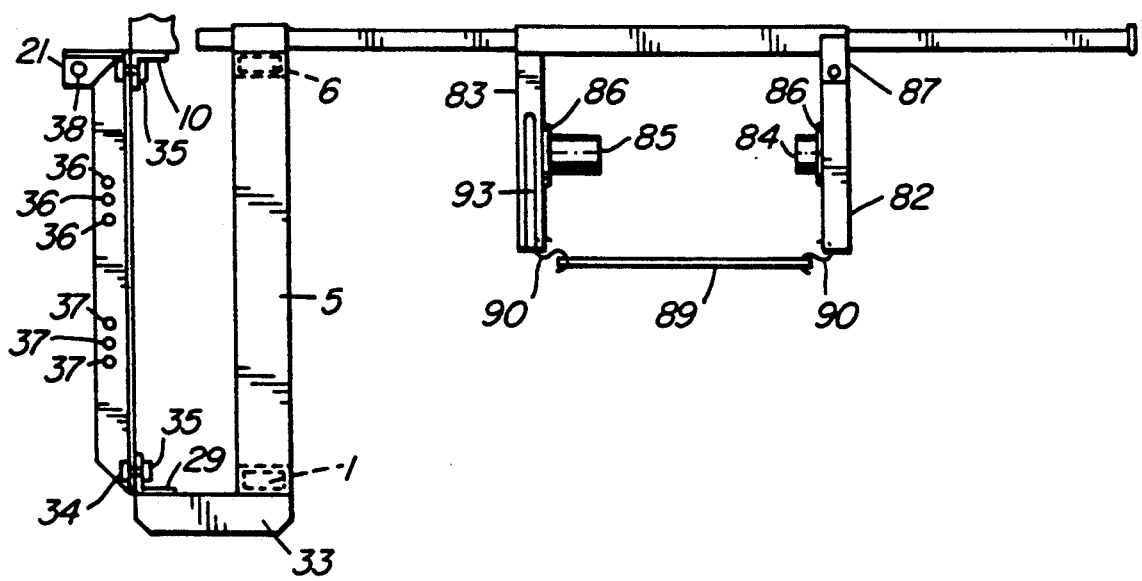
FIG. 9 is a side view showing an alternative twenty inch wrapping assembly.

In FIG. 9, one notes that nuts and bolts 34 and 35 attach rear lower frame member 29 to right and left support members 15, 16, 17 and 18. Support members 15, 16, 17 and 18 have a plurality of holes for adjustment to varying sizes of front-end loaders. The upper set of pin holes is shown as 36 and the lower set of pin holes is shown as 37. These accommodate pins 19A, 19B and 20A and 20B. Also shown in FIG. 9 is pin hole 38 for use for the three-point hitch support member pin 23.

In FIG. 3, mounted within the rectangular frame for lateral slidable movement is a second sliding frame member comprising an upper member 39, a lower member 40, a right upstanding member 41 and a left upstanding member 42 thereby forming a rectangular frame. Left upstanding member 42 provides support for the rotating spindle probe 47.

On each of the four corners of the second sliding frame member are welded flat bars and angle irons shown generally as 43, 44. Mounted within these are rollers 45. The rollers 45 permit the sliding frame to move laterally between upper frame member 6 and lower frame member 7.

Figure 4:
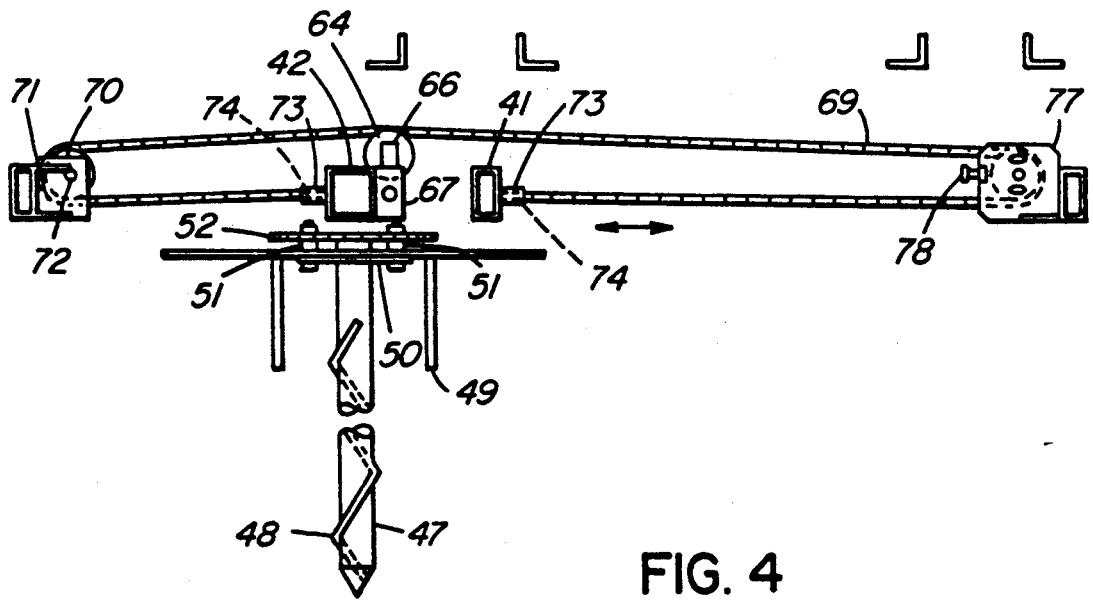
FIG. 4 is a section A—A through the lateral chain drive of FIG. 3.
Figure 6:
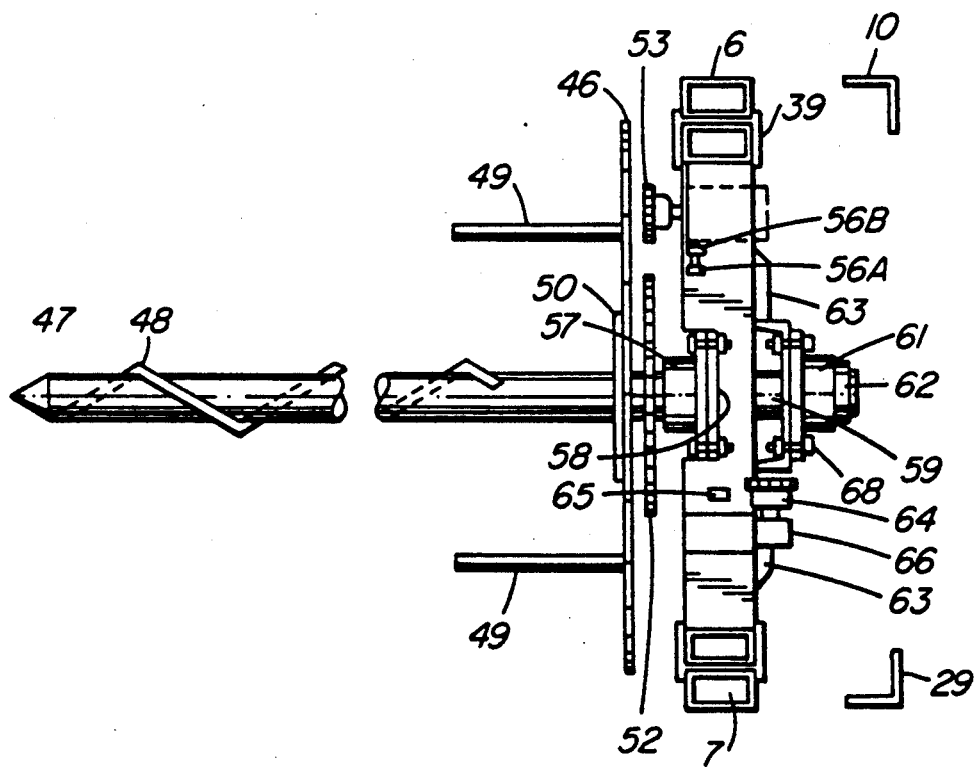
FIG. 6 is a section B—B of FIG. 3.

In FIGS. 3, 4 and 6, one notes that mounted on left upstanding member 42 is large spindle probe 47 which extends outwardly and perpendicularly from the second sliding frame. The large spindle probe 47 is used to spear the centre of round bales of hay and transport them. The large spindle probe 47 is rotatably mounted within the sliding frame and is powered by a motor 55. The large spindle probe 47 is also equipped with a twisted rod 48. This increases friction between the inside of the bale and the large spindle probe 47. The large probe 47 is also equipped with a large backing plate 46 and mounted thereon is a small backing plate 50.

Between the backing plate 46 and large gear plate 52 are spacers 51. A large gear plate is fixably mounted to the spindle probe 47. A small gear 53 is connected to motor 55 (generally a hydraulic motor is used but an electric or other type of motor is suitable). An endless chain 54 provides movement from the small gear 53 to the large gear plate 52. A chain adjustment bolt 56A and nut 56B are used to adjust the tension on the chain.

As previously mentioned, the large spindle probe 47 is mounted to the right upstanding member 42 of the sliding frame. From front to back is a front bearing 57, a front bearing plate 58, a pipe 59, a bearing plate 60, a bearing 61 and a locking collar 62. The bearing assembly is mounted onto the left upstanding member 42 by means of support webs 63.

In order to move the sliding frame laterally, a hydraulic motor 75 mounted by motor bracket 76 on the motor plate 77 is used to provide power to the chain for lateral movement 69. Mounted to the rear of the bearing assembly of the rotatably mounted spindle probe 47 is an idler 64. An adjustment bolt 65 is used to adjust the tension on chain 69. The chain is coupled to the right upstanding member 41 of the sliding frame by means of a chain retainer 73 and a pin 74. The opposite side of the sliding frame is also attached to the chain 69 by means of a chain retainer 73 and a pin 74. The chain is secured to the left side of the main frame for rotating movement by means of a idler mount 71 on which is mounted an idler 70 by means of a pin 72. Idler 64 is supported by square tube 66 which in turn is supported by a large square tube 67.

The bearing assembly is secured to the spindle probe by means of nuts and bolts 68. On the right side of the main frame the chain for lateral movement 69 is secured about the motor 75. An adjustment bolt 78 is used for varying the tension on the lateral chain 69. Movement of the sliding frame within the main rectangular frame in the lateral direction is restricted by a right stop block 79 and a left stop block 80.

Figure 8:
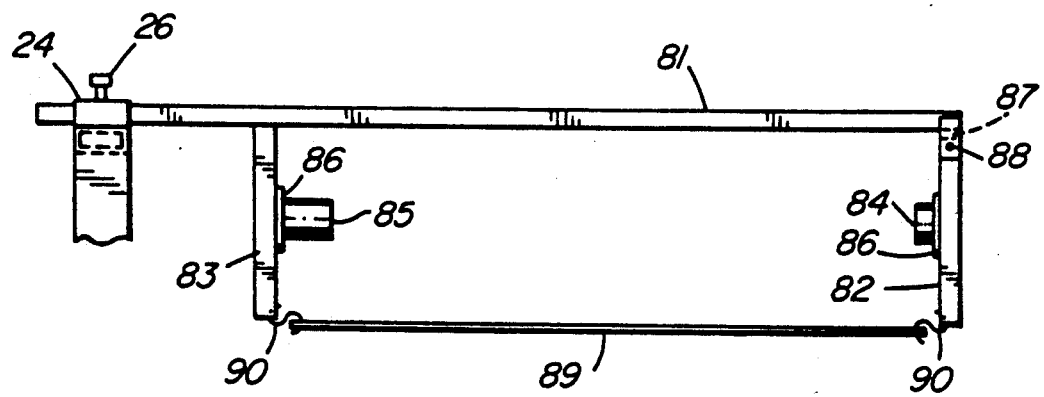
FIG. 8 is a side view showing a fifty inch wrapping assembly.

FIG. 8 is a side view showing the wrapping assembly apparatus for use with fifty inch plastic wrap. The wrap is used to cover the bales in order to reduce spoilage of the hay. There is a main wrapper arm 81 which is inserted into wrapper mounting aperture 24 on the frame. An adjustment bolt 26 is used to tighten the main wrapper arm 81 into the square tube 24. Depending downward from the remote end of the main wrapper arm 81 is a right vertical member 82. A second left vertical member 83 also hangs downwardly. Mounted on the right vertical member 82 and the left vertical member 83 are a right wrap holder 84 and a left wrap holder 85, respectively, which are secured by means of collars 86. Both the right vertical member 82 and the left vertical member 83 are hinged to the main wrapper arm 81 by means of hinges 87 and hinge pins 88. After a roll of plastic wrap (not shown) is mounted between the right wrap holder 84 and the left wrap holder 85, a resilient means 89 is coupled to S-hooks 90 on right vertical holder 82 and left vertical holder 83 thus producing tension on the roll. Tension is necessary so that the plastic film is secured tightly about the bale.

FIG. 9 shows a main wrapper arm 91 on which is mounted a moveable holder arm 92 which is moved along the main wrapper arm 91 by means of a handle 93. When the operator wishes to wrap a bale, using wrap of less width than the bale, he simply takes handle 93 thus moving arm 92 from side to side along arm 91 thus covering the width of the bale. Twenty inch wrap is used on this wrapping assembly. Thus a bale of any length and diameter can be wrapped by means of helical wrapping.

In operation, the operator places the apparatus of the present invention on the front end loader 2 of a tractor 1 and lowers it such that spindle probe 47 is in line with the centre of a large bale 4. The large bale is speared by means of the spindle probe 47 and secured by smaller probe 49. The operator then lifts the bale upwardly and moves the bale to either a wrapping area or a dispensing area.

If the operator wants to wrap the bale, the motor 75 is activated and the chain 69 moves the second inner frame laterally in the desired direction such that the wrapping arm 81 (or 91 in the case of the twenty inch wrap) is adjacent and parallel to the edge of the large bale 4. Wrap is then applied to the bale 4, by rotating the spindle probe in a clockwise or counter-clockwise direction. As the large bale rotates, the wrap is secured about the bale 4 and affixed to itself. The bale 4 once wrapped can then be placed again back in a suitable storage area by withdrawing the spindle probe 47 from the interior of the bale.

In the event that the farmer wants to dispense hay into a bunk feeder or alongside the vehicle, the motor 75 is activated thereby moving the lateral chain 69, such that the sliding frame is moved completely to the right as shown in FIG. 2. Thereafter, motor 55A is activated and the bale is rotated in a counter-clockwise direction as hay from the bale 4 peels off in layers into the appropriate feeding area for cattle, etc.

Because the apparatus is off balance when in the dispensing position, the sliding frame and spindle probe 47 are generally moved back to a position close to the centre of gravity of the front-end loader for the purposes of stacking or transporting bales.

The invention is not restricted to the particular embodiments shown hereto but is intended to extend to all variations thereof.

What I claim as my invention is:

1. A bale handling and wrapping apparatus adapted to be installed on a front-end loader or three-point hitch of a power source comprising: a rectangular main frame, said main frame adapted to be mounted transverse to the line of travel of said power source and extending laterally from one side to the opposite side and extending outwardly on at least said opposite side thereof; a large spindle probe rotatably mounted on a sliding frame mounted within said frame and extending perpendicularly outwardly from the plane of said frame; said spindle probe being activated by a hydraulic motor and being adapted to engage a round bale of hay and rotate the same; said spindle probe including a circular backing plate on which are mounted a plurality of smaller, bale engaging probes extending perpendicularly outward therefrom; said frame including at least one aperture adapted to receive a wrapping means; said wrapping means being adapted to receive a roll of plastic sheeting and dispense the same; said wrapper means extending perpendicularly outwards from at least said one side of said frame and parallel to said spindle probe; wherein in operation, said spindle probe on said sliding frame is adapted to be moved laterally across said main frame to said one side and to a position located at said opposite side by a transversing means; said transversing means comprising a hydraulic motor, an endless chain extending from side to side of said frame and over idler sprockets adjacent each of said sides; thereby facilitating the wrapping of bales of varying diameter when said sliding frame is positioned relative to said one side and permitting the dispensing of hay on the said opposite side of the line of travel of said power source when said sliding frame is positioned extending outwardly at said opposite side, such that as said power source moves in a forward direction, a linear bunk feeder can be filled with hay without backing up said power source.

2. A bale handling and wrapping apparatus as claimed in claim 1, wherein said wrapping means is adapted to receive a fifty inch roll of plastic film and dispense the same under tension.

3. A bale handling and wrapping apparatus as claimed in claim 1, wherein said wrapping means comprises a main wrapper arm and a movable holder arm; said holder arm adapted to slide along said main wrapper arm; said holder arm adapted to receive a twenty inch roll of plastic film and, when in operation said holder arm is moved back and forth along the main arm by means of a handle activated by an operator, said wrapping means dispenses said plastic wrap under tension, thereby helically wrapping a bale of hay.

4. A bale handling and wrapping apparatus as claimed in claim 1, wherein said transversing means is adapted to position said spindle probe such that the outside of said bale is adjacent to said wrapping means.

5. A bale handling and wrapping apparatus as claimed in claim 4, wherein said spindle probe is rotated and plastic wrap is applied under tension to said bale from said wrapping means thereby effectively covering said bale and protecting the same from the elements.

6. A method of using the bale handling and wrapping apparatus of claim 1 to dispense hay into a bunk feeder, comprising the steps of:
    (a) engaging a round bale of hay with said spindle probe of said bale handling and wrapper apparatus;
    (b) said spindle probe and said sliding frame being positioned within said main frame at substantially the mid-point of said power source;
    (c) raising said bale handling and wrapping apparatus on a front-end loader and transporting said bale to a feeding area;
    (d) moving said spindle probe, sliding frame and said bale laterally along said main frame by said transversing means to the side of said frame extending outwardly from the line of travel; and
    (e) rotating said spindle probe in a counter-clockwise direction thereby unwrapping and dispensing said hay while simultaneously advancing said power source along side said bunk feeder, such that as the bale is unwrapped, large pieces of hay separate from the unwrapped portion of the bale and fall downwardly into the bunk feeder.

* * * * *